United States Patent Office 3,420,379
Patented Jan. 7, 1969

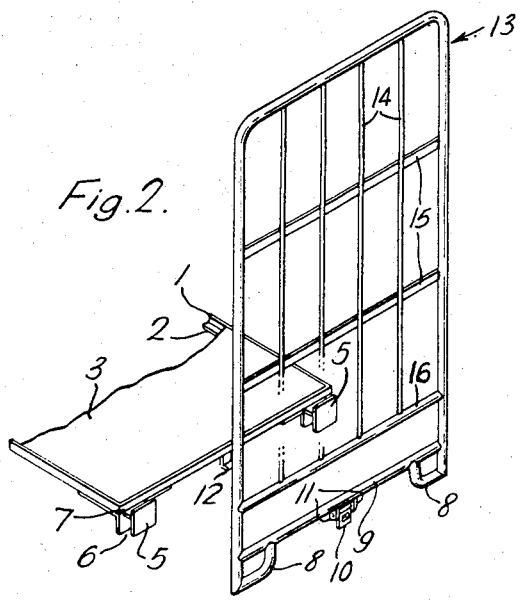
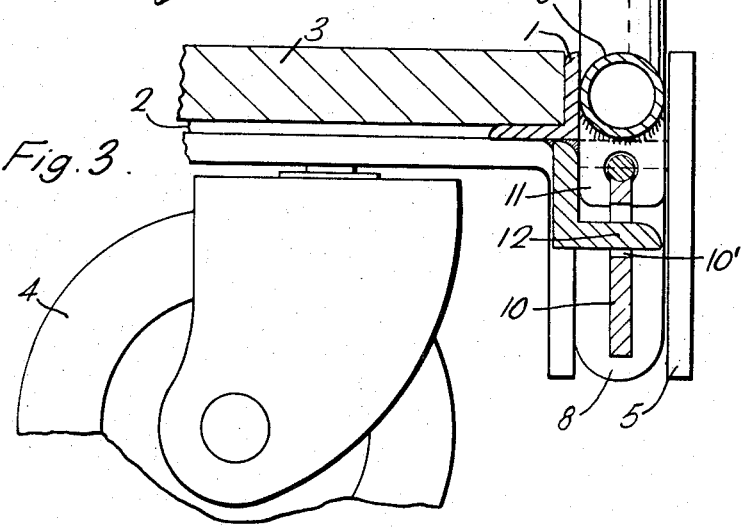
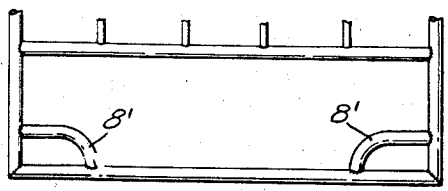

3,420,379
LOAD CARRYING DEVICE
Ronald Arthur Berryman, Cheshunt, England, assignor to Horville Engineering Company Limited, London, England
Filed July 8, 1966, Ser. No. 563,897
U.S. Cl. 211—1    14 Claims
Int. Cl. B65b *3/02*; B62d *25/02*

ABSTRACT OF THE DISCLOSURE

The specification describes hand-propelled containers for holding unit loads of goods during movement to and from road transport vehicles and during transit of the goods in such vehicles. The containers have load-retaining walls which are easily detachable for convenient storage, and which couple to the load-supporting base of the container in such manner as not to encroach upon its load-supporting area.

---

Figure 1:
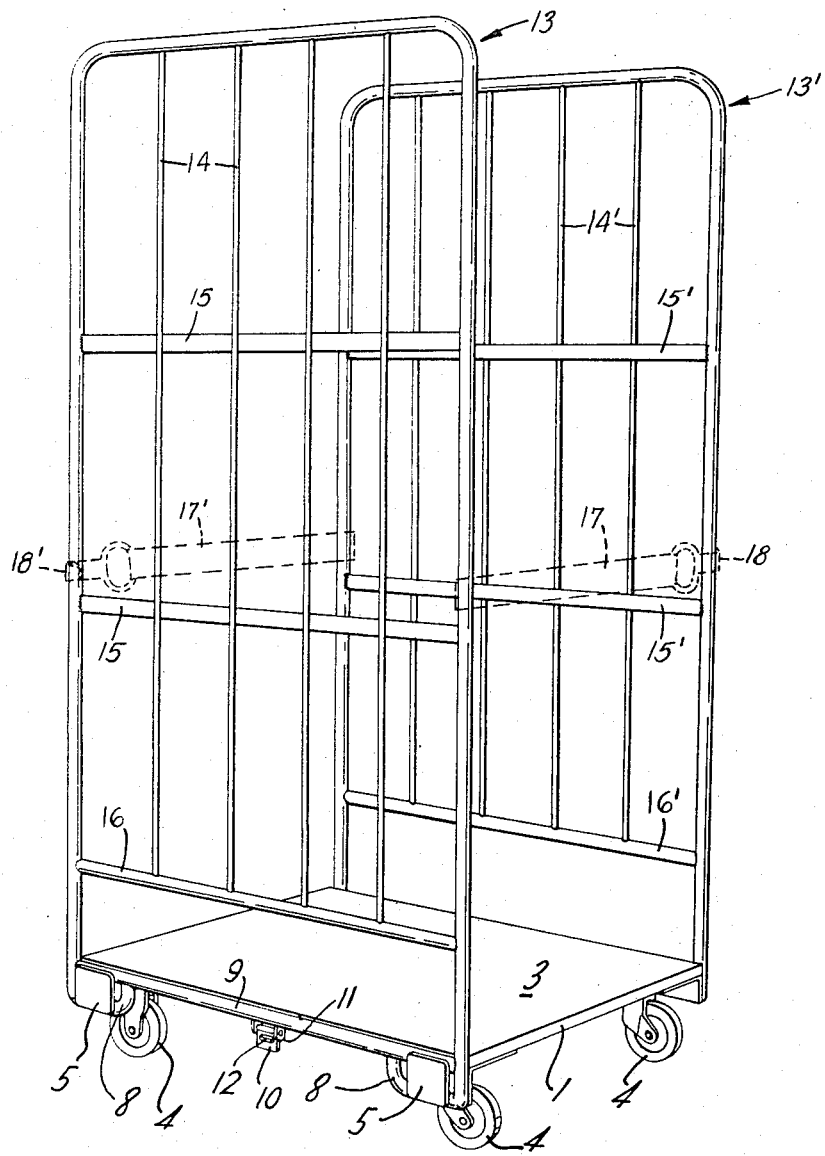

This invention relates to load-handling devices.

Goods such as groceries ordered from a warehouse by geographically distributed shops are freuqently freeloaded into the transport vehicle by hand, the goods being hand picked off the vehicle at the various destinations to fulfill the individual orders. This procedure is tiring and time consuming and causes difficulties in busy streets where parking space and time are put at a premium. It is known to pack the goods onto pallets at the warehouse and to fork-lift the pallets into the vehicle but in many warehouses this is not possible or convenient and unloading is hardly simplified.

An object of the invention is to provide load-handling devices which can be loaded into vehicles complete with unit loads of goods and easily transported with their unit loads from the vehicle to receiving stores by one man and which do not materially reduce the quantity of goods which can be carried by the vehicle.

Another object of the invention is to provide such load handling devices comprising a load-supporting base and detachable load-retaining walls which when in working position do not encroach upon the load-supporting surface of the base and which can withstand rough handling without suffering deformation which will interfere with their proper coupling to the base.

Load-handling devices according to the invention include as basic features: a wheeled base having a deck for supporting a load during conveyance along the ground, and a pair of detachable wall components to assist in retaining a load on the base; the said base adjacent each of two opposed margins of said deck, and each of said wall components at the bottom portion thereof, being formed or provided inter se with bar and groove or channel coupling elements which are engageable by bodily movement of the wall component thereby to support the wall component in substantially upright position outside the confines of the said deck without any encroachment on its load-supporting surface.

A locking device may be provided for locking each wall component in position on the base but the said couplings are preferably such that once engaged the walls cannot be disengaged by pressure exerted on the walls in their own planes and the device can consequently be propelled along the ground using one vertical side of each wall component as a hand hold, even if no such locking device is provided or actuated.

The base is preferably mounted on swivel wheels of small diameter so that the load-supporting deck is close to the ground, like the load-supporting deck of a conventional pallet.

While two wall components only have been specified, a device according to the invention may comprise more than two such components. Thus two wall components connectable to the base at opposite sides in the manner referred to can be used for holding one or two further wall components in place as for example by providing the different wall components along their side edges with registerable eyes through which retaining pins can be passed. However the two wall components specified in the above definition of the invention are in any case adequately supported upright by their coupling with the base and further support for these walls is not necessary.

Where reference is hereafter made to "the wall component" or "the wall components" this means one or both of the essential wall components for coupling to the base as above specified.

Another important preferred feature of the invention is the formation of the wall components as a framework of bars and the design of these walls and the couplings so that the bar portions of the wall components which engage the grooves or channels on the base are without free ends. This considerably reduces risk of the wall components being damaged by rough handling in such a way that they cannot be coupled to the base.

A type of wall-to-base coupling which may be employed in a device according to the invention, for each of the wall components, comprises a deep upwardly opening channel or deep grooves on the base, into which bar portions at the lower end of the wall component can be inserted by lowering the wall component in a vertical position, suitable locking means being provided if required to prevent upward displacement of the wall component in use. Alternatively laterally spaced wall holders projecting outwardly from the base and formed with sockets comprising laterally opening bar receiving grooves with supporting faces on which the wall component can rest may be provided, suitable locking or catch means for locking or holding the wall components against displacement from the sockets being provided.

Each wall component preferably comprises a rigid framework of bars of which all the constituents parts lie in the same general plane or substantially so. Multiple such wall components can be conveniently stacked and stored ready for use.

The wall components can have upper surfaces for bearing a superencumbent base so that one loaded device can be stacked on another.

Embodiments of the invention, selected by way of example, are illustrated in the accompanying drawings which will now be referred to.

In the drawings, FIGURE 1 is a perspective view of a complete load-handling device according to the invention; FIG. 2 is a perspective view of one side of the base of the device shown in FIGURE 1; FIGURE 3 is a detail on a larger scale showing one side of the device in cross-section with the appertaining wall component in place; and FIGURE 4 is a detail of a modification.

The load-handling device according to FIGS. 1 to 3 has a base comprising a metal frame 1 providing an internal flange 2 on to which is bolted a loading deck 3 formed by a ¾′″ plywood panel. The frame is mounted on four swivel wheels 4.

The base is rectangular in plan and is provided at each of its longer sides with a wall holder comprising a pair of buffer-like parts 5 secured to the frame 1 and projecting from the load deck 3. Each such part provides a downwardly facing lower groove 6 and an upwardly facing upper groove 7.

Each of the detachable walls comprises a metal tubular frame 13, 13′ having internal vertical bars 14, 14′, transverse slats 15, 15′ and a transverse tube 16, 16′, and tubes 8 each forming a loop depending from the bottom transverse frame member 9 at one corner of the wall frame.

The width of each wall frame and the disposition and size of the said corner loops thereof, in relation to the dimensions of the buffer-like parts 5 and the depths of the grooves 6 and 7 thereof is such that the wall frame can be coupled to the base in the following manner. Firstly the wall is angled in the vertical plane so that the tubes 8 are beneath the parts 5; then the lower end of the wall is raised to cause portions of the tubes 8 to enter the grooves 6 in such parts. Holding the wall thus engaged in the bottom grooves 6 its upper end is swung forwardly until the wall is vertical. In this motion the end portions of the frame member 9 forming the tops of the said corner loops pass into a position over the tops of the parts 5. The wall is now allowed to fall under gravity so that the said end portions of member 9 enter the grooves 7 and come to rest on the webs separating these grooves from grooves 6. In this downward motion the tubes 8 descend in but do not pass out of the lower grooves 6. Consequently the wall is supported upright and will not swing forwardly or backwardly in a plane normal to its own plane. The complete device is intended to be pushed along the ground, parallel with the wall components, using the vertical sides of the wall components at one end of the device as hand holds. As will hereafter be described, catch means are provided for holding the wall components against displacements in their own planes, relative to the base, but it is to be noted that even if such catch means were omitted, horizontal forces could still be exerted against the wall components, at one end of the device, without the wall components becoming uncoupled from the base; this is because the corner loops formed by bar portions 8 and 9 encircle the buffer webs separating grooves 6 and 7 and such forces would merely cause the wall components to tilt over a certain distance relative to the base until the rising tubes 8 abut against the webs of the appertaining buffer-like parts 5. This is an important safety factor.

In order to hold the walls substantially against any displacement relative to the wheeled base, catch means are provided. The catch means for both wall components are the same. A plate 10 with an aperture 10' is freely pivoted in lugs 11 welded to the lower horizontal bar 9 of each wall component. The base is provide with a bracket 12 centrally of each of its longer sides. During coupling of a wall component to the base as above described the lower portion of the plate 10 connected to that wall component (the portion below the plate aperture) rests against the horizontal flange of the appertaining bracket 12 while the tubes 8 are being raised into the grooves 6. When the wall component, after having been swung into its vertical position, is subsequently lowered to cause the end portions of bar 9 to enter the grooves 7, the plate 10 slides down against the said horizontal bracket flange until, just as the bar 9 is coming to rest on the webs separating the grooves 6 and 7, the aperture 10' in the plate comes into registration with the said flange whereupon the plate pivots under gravity into a vertical position and the bracket flange enters the plate aperture. The wall component is thus held against all but very slight movement or play relative to the base. When it is desired to uncouple the wall component it is merely necessary first to pivot the plate 10, e.g. with the foot, out of engagement with the bracket 11.

The load handling device, assembled as shown in FIG. 1, can be used to hold a selected load of articles within a transport vehicle ready for wheeling into the premises to which the articles are to be delivered. The benefit of this procedure is best realised when using transport vehicles fitted or associated with a hydraulic or other lifting device, e.g. a tail-lift device, on to which the goods can be pushed from the interior of the vehicle preparatory to lowering of the goods to ground level. The whole contents of the transporter can be located on devices of the described form within the vehicle, the devices being if necessary stacked one on another.

If desired one or more straps or other retaining member or members such as 17, 17' shown in broken line in FIGURE 1 may be provided to extend between the wall components at one or each end of the load-handling device to restrain the load from falling from such end. The members 17, 17' are elastically extensible. They are permanently connected one to each wall component and each of them has a hook 18, 18' which engages the other wall component. The said members serve to pull the wall components firmly inwardly against the load.

If the load-handling devices are to be stacked the detachable walls may be provided with top portions providing supporting surfaces for superposed bases.

The illustrated load-handling device can be raised by a fork-lift truck, the lifting forks passing between the parts 5 at either of the walled sides of the base, and beneath the load supporting deck.

A possible modified shaping of removable wall is shown in FIGURE 4. In this case the corner loops for engaging over the buffer-like parts 5 are formed inside the main wall frame by bar portions 8'. The wall couples to the base in the same way as the wall shown in FIGURES 1 to 3. However, this shaping is not so convenient if the device has to be lifted by a fork-lift truck in view of the presence of the bottom frame member below the level of the deck and between the parts 5. A wall component according to FIG. 4 can also be held against displacement by means of a suitable locking or catch device, e.g. a catch device as shown in the earlier figures or a catch device mounted on the base for engaging the lower transverse bar of the wall framework.

What I claim is:

1. A load-handling device comprising a wheeled base having a deck for supporting a load during conveyance along the ground, and a pair of detachable wall components to assist in retaining a load on the base; the said base adjacent each of two opposed boundaries of said deck, and each of said wall components at the bottom portion thereof, being formed or provided inter se with bar and groove coupling elements which are engageable by bodily movement of the wall component thereby to support the wall component in substantially upright position outside the confines of the said deck without any encroachment on its load-supporting surface, and each of said wall components having catch means which as said wall component moves into said supported upright position automatically engages a part on the base to hold the wall component against displacement until such catch means is released.

2. A load-handling device according to claim 1 wherein said groove elements receive bar portions without free ends.

3. A load-handling device comprising a wheeled base having a deck for supporting a load during conveyance along the ground, and a pair of detachable wall components to assist in retaining a load on the base; the said base adjacent each of two opposed boundaries of the deck and each of said wall components at the bottom thereof being inter se provided with the co-operative elements of a coupling comprising lower and upper transverse bars and receptive grooves, which coupling, without lifting of the base, is engageable by bodily manipulation of the wall component to engage first the lower and then the upper coupling elements, and each of said wall components having catch means which as said wall component moves into said supported upright position automatically engages a part on the base to hold the wall component against displacement until such catch means is released.

4. A load-handling device which comprises a wheeled base having a deck for supporting a load during lifting or conveyance along the ground, and a pair of detachable wall components, each comprising a framework of bars, to assist in retaining a load on the base; the said base has wall component holders which provide grooves located outwardly of two opposed boundaries of said deck for receiving portions of bars of said wall components at the bottom margins thereof thereby to support said wall components substantially upright outside the confines of said deck without any encroachment on its load-supporting surface; and said base and each of said wall components have co-operating parts of a catch device which automatically inter-engage on movement of such wall component into said supported upright position thereby to hold such wall component substantially against displacement relative to the base until said catch device is released.

5. A load-handling device according to claim 4 wherein the base is provided adjacent each of said boundaries with upwardly and downwardly opening grooves and each wall component is provided with bar portions which are vertically spaced for reception by such grooves.

6. A load-handling device according to claim 4 wherein the base is provided adjacent each of said boundaries with buffer-like parts spaced along such boundary and each having upwardly and downwardly opening grooves, and each wall component is provided at the bottom thereof with vertically spaced transverse bar portions without free ends for engagement in said grooves to hold the wall component substantially upright and against uncoupling under horizontal forces exerted against the wall component in its own plane.

7. A load-handling device according to claim 4 wherein the said bar portions which engage the grooves are joined at both ends to the rest of the frameworks.

8. A load-handling device according to claim 4 wherein each said wall component is composed of a rigid framework of which all constituent parts lie in the same general plane.

9. A load-handling device according to claim 4 wherein the base is provided with locking means which are engageable with the wall components to lock the bar and groove coupling elements in engagement.

10. A load-handling device according to claim 4 wherein the base is provided adjacent each of said boundaries with buffer-like parts each having grooves for receiving bar portions of a said wall component, said buffer-like parts extending below the load-supporting deck but being laterally spaced along such boundary to allow the forks of a fork-lift truck to pass between such parts and under the deck for lifting the base.

11. A load-handling device according to claim 4 wherein at least one elastically extensible retaining member is provided for stretching between said wall components at least at one end of said device thereby to pull said wall components firmly inwardly against a load.

12. A load-handling device which comprises a wheeled base having a deck for supporting a load during lifting or conveyance along the ground, and a pair of detachable wall components, each comprising a framework of bars, to assist in retaining a load on the base; and wherein the said base has wall component holders, each of which provides a pair of grooves, and which are located outwardly of two opposed boundaries of the deck, into which grooves portions of bars of said wall components at bottom margins of such components are insertable by bodily displacing the wall components in their own planes relative to said base, thereby to support said wall components substantially upright outside the confines of the said deck, the said bar portions which engage said grooves being joined at both ends to the rest of the frameworks forming said wall components.

13. A load-handling device according to claim 12 wherein said wall component holders provide deep upwardly opening grooves for receiving said wall components.

14. A load-handling device which comprises a wheeled base having a deck for supporting a load during lifting or conveyance along the ground, and a pair of detachable wall components, each comprising a framework of bars, to assist in retaining a load on the base; wherein outwardly of each of two opposed boundaries of the deck, said base has wall component holders providing grooves into which portions of bars at a bottom margin of either of said wall components are insertable by bodily displacing such wall component in its own plane relative to said base, thereby to support such wall component substantially upright outside the confines of said deck without any encroachment on its load-supporting surface, the said bar portions which engage said grooves being joined at both ends to the rest of the framework forming such wall component, and wherein said wall component holders located outwardly of each of said opposed boundaries extend below the said load-supporting deck but are laterally spaced along such boundary to allow the forks of a fork-lift truck to pass between such holders and under the deck for lifting said base.

References Cited

UNITED STATES PATENTS

| | | | |
|---|---|---|---|
| 2,147,627 | 2/1939 | Bulick | 296—52 |
| 2,573,395 | 10/1951 | Breitbarth | 296—52 |
| 1,103,689 | 7/1914 | Russell | 280—33.99 |
| 2,235,727 | 3/1941 | Pearlman | 214—75 |
| 2,635,771 | 4/1953 | Black | 214—75 |
| 3,173,708 | 3/1965 | Machielse et al. | 280—79.1 XR |

FOREIGN PATENTS 233,970  6/1964  Austria.

CHANCELLOR E. HARRIS, *Primary Examiner.*

U.S. Cl. X.R.

296—52; 280—79.3